United States Patent Office 3,535,396
Patented Oct. 20, 1970

3,535,396
ISOMERIZATION OF 5-VINYLBICYCLO [2.2.1]
HEPT-2-ENES WITH TITANIUM CATALYST
Wolfgang Schneider, Brecksville, Ohio, assignor to The
B. F. Goodrich Company, New York, N.Y., a corporation of New York
No Drawing. Filed Apr. 7, 1969, Ser. No. 814,151
Int. Cl. C07c 5/28
U.S. Cl. 260—666
10 Claims

ABSTRACT OF THE DISCLOSURE

5 - vinylbicyclo[2.2.1]hept - 2 - enes heated in the presence of a titanium catalyst system are isomerized to 5-ethylidenebicyclo[2.2.1]hept - 2 - enes. The catalyst systems of this invention are titanium trihalides or cyclopentadienyl titanium trihalides with an organolithium compound or lithium aluminum hydride. The present catalyst systems are highly efficient and capable of isomerizing the 5 - vinylbicyclo[2.2.1]hept - 2 - enes within very short periods of time. 5 - ethylidenebicyclo[2.2.1]hept - 2 - enes are useful comonomers for polymerization with α-olefins such as ethylene and propylene.

BACKGROUND OF THE INVENTION

Previously known processes for the isomerization of 5-vinylbicyclo[2.2.1]hept - 2 - ene to 5 - ethylidenebicyclo[2.2.1]hept - 2 - ene have not been completely satisfactory. Large amounts of catalyst have been necessary to achieve acceptable rates of isomerization, i.e., poor catalyst efficiency, and consequently significant amounts of polymeric residues were obtained.

SUMMARY OF THE INVENTION

I have now found quite unexpectedly an improved catalytic process for the isomerization of 5-vinylbicyclo[2.2.1]hept - 2 - enes to 5 - ethylidenebicyclo[2.2.1]hept-2-enes. Rapid isomerization rates are realized with the process of the present invention. The increased rate of isomerization and excellent catalyst efficiencies obtained with the present catalysts are significant since it is now possible to achieve isomerization in very short periods of time employing low catalyst concentrations. In this manner polymeric by-products formed during the isomerization are minimized and in most instances completely eliminated. The present process utilizes a titanium catalyst comprising a titanium trihalide or cyclopentadienyl titanium trihalide with an organolithium or lithium aluminum hydride. The isomerization reaction of this invention may be represented as follows:

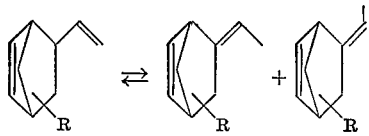

wherein R is a hydrogen or alkyl group containing from 1 to 4 carbon atoms. The process is particularly useful to obtain 5 - ethylidenebicyclo[2.2.1]hept - 2 - ene (R=H) which is a useful monomer for copolymerization with olefins such as ethylene and propylene.

DETAILED DESCRIPTION 5-vinylbicyclo[2.2.1]hept-2-enes employed in the present isomerization process correspond to the structural formula:

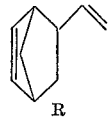

wherein R is a hydrogen or an alkyl group containing from 1 to 4 carbon atoms. The present process is particularly advantageous for the isomerization of 5-vinylbicyclo [2.2.1]hept - 2 - ene (where R=H) since this material is readily available from the Diels-Alder addition of 1,3-cyclopentadiene and 1,3 - butadiene. Other 5 - vinylbicyclo [2.2.1]hept - 2 - enes, such as methyl - 5-vinylbicyclo [2.2.1]hept - 2 - enes obtained from the reaction of 1,3-cyclopentadiene with piperylene or methyl 1,3-cyclopentadiene and butadiene, are isomerized just as effectively by the present process.

The catalyst system employed in the present process comprises a titanium compound and an organolithium compound or lithium aluminum hydride. The particular titanium compounds employed correspond to the formulae $TiX_3$ and

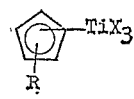

wherein R is a hydrogen or an alkyl group, preferably containing from 1 to 4 carbon atoms, and X is a halogen such as chlorine, bromine or iodine.

Employed with the titanium trihalide or cyclopentadienyl titanium trihalide to form the catalysts of this invention are organolithium compounds of the formula RLi wherein R is an alkyl group containing from 1 to 12, and more preferably from 1 to 6, carbon atoms. Exceptional results have also been obtained with lithium aluminum hydride. In addition to the above-listed compounds of lithium other alkali metal aluminum hydrides and organometallic compounds, such as for example, alkylaluminum hydrides or halides, may be advantageously employed.

The present catalyst systems are obtained by contacting the titanium compound with the organolithium compound or lithium aluminum hydride. The catalyst may be prepared prior to use or the individual catalyst components may be mixed in the reactor in the presence of the 5 - vinylbicyclo[2.2.1]hept - 2 - ene. If the catalyst system is prepared prior to the isomerization, the titanium compound and the organolithium compound or lithium aluminum hydride are generally admixed in an inert solvent. This latter method facilitates subsequent storage, handling and charging of the catalyst.

While large amounts of the titanium compound may be employed, the concentration will generally range from about 100 millimols per mol 5 - vinylbicyclo[2.2.1]hept-2 - ene to about 0.1 millimol per mol 5-vinylbicyclo[2.2.1] hept-2-ene. Excellent results have been obtained when the concentration of the titanium compound is between about 50 millimols and 1 millimol per mol 5 - vinylbicyclo[2.2.1] hept-2-ene. About 1 to 10 mol equivalents of the organolithium compound or lithium aluminum hydride will be employed per mol equivalent of the titanium compound. It is often advantageous to employ sufficient excess of the organolithium compound or lithium aluminum hydride so that it will also serve as a scavenger to remove impurities such as oxygen, alcohols, water and the like present in the system.

The isomerization is carried out by heating the 5-vinylbicyclo[2.2.1]hept-2-ene in the presence of the catalyst. The 5-vinylbicyclo[2.2.1]hept-2-ene is generally charged to the reactor and the pre-formed catalyst or the individual catalyst components added thereto. The catalyst or individual catalyst components may be completely charged at the outset of the isomerization or charged continuously as the isomerization progresses. The process may be conducted employing either batch or continuous techniques. Prior to the introduction of the pre-formed catalyst or the titanium compound if the catalyst is to be prepared in situ, an amount of organo lithium compound or lithium aluminum hydride may be charged to the reactor to remove small amounts of undesirable impurities present in the system. The 5-ethylidenebicyclo[2.2.1]hept-2-ene can be recovered by fractional distillation or it may be removed continuously throughout the run if continuous operation is employed.

The isomerization may be conducted in an inert diluent such as the aromatic or saturated aliphatic hydrocarbons. High-boiling saturated hydrocarbons are typically employed since they do not interfere with the recovery of the 5-ethylidenebicyclo[2.2.1]hept-2-ene and also permit operation of the process within the desired temperature range without the use of pressure vessels. Useful hydrocarbon solvents include pentane, isopentane, 2,2-dimethylpentane, 2,4-dimethylpentane, 3,3-dimethylpentane, 3-ethylpentane, n-hexane, isohexane, 3-methylhexane, n-heptane, n-octane, isooctane, cyclohexane, benzene, toluene, the xylenes, mesitylene and the like or mixtures thereof. If a diluent is employed the ratio of the diluent to 5-vinylbicyclo[2.2.1]hept-2-ene will generally range between about 1:10 and about 10:1.

It is not essential that the 5-vinylbicyclo[2.2.1]hept-2-ene be absolutely pure, however, the presence of large amounts of impurities should be avoided for best results. Small amounts of impurities such as water, alcohols, peroxides and air present in the 5-vinylbicyclo[2.2.1]hept-2-ene or diluent can be tolerated, however, it is preferred they be removed by the addition of a scavenging agent, which in this case can also serve as a catalyst component, or by some other suitable means. Distillation or sieving of the 5-vinylbicyclo[[2.2.1]hept-2-ene and diluent prior to use will generally suffice to remove most impurities which seriously impair the catalyst efficiency or promote formation of polymeric materials.

The isomerization process is typically conducted under a dry atmosphere of an inert gas such as nitrogen or argon and may be conducted at atmospheric, sub-atmospheric or superatmospheric pressure depending on the reaction conditions and diluent employed.

The isomerization is typically conducted at temperatures above 40° C. and up to 300° C. or above. Excellent results, i.e., high catalyst efficiency and a rapid isomerization, generally 90% or more conversion of the 5-vinylbicyclo[2.2.1]hept-2-ene in 5 minutes or less, have been obtained within the temperature range 100 to 200° C. The rapid rate of isomerization achieved with the present invention permits the isomerization of 5-vinylbicyclo[2.2.1]hept-2-ene to 5-ethylidenebicyclo[2.2.1]hept-2-ene on a continuous basis. With continuous processes such as those employing tubular reactors and capable of achieving short contact times of the 5-vinylbicyclo[2.2.1]hept-2-ene with the catalyst, temperatures above 200° C. may be desirable.

The following examples illustrate the invention more fully, however, they are not intended to limit the scope thereof. All parts and percentages unless indicated otherwise are on a weight basis.

EXAMPLE I 13.5 mls. (0.1 mol) 5-vinylbicyclo[2.2.1]hept-2-ene prepared by the Diels-Alder reaction of 1,3-cyclopentadiene and 1,3-butadiene as described by A. F. Platé and N. A. Belikova in Zhurnal Obshchei Khimii, 30, No. 12, 3945–53 (1960) was charged to a dry argon-purged reactor containing 20 ml. mesitylene and cyclopentadienyl titanium trichloride (0.22 gram; 1 millimol) added at room temperature with stirring while maintaining the argon purge. After charging about 0.1 gram lithium aluminum hydride (2.5 millimols) the reactor and its contents were heated to 150° C. under an argon atmosphere. The heating was continued for 30 minutes. The resulting reaction product analyzed by vapor phase chromatography was found to contain 89.7% 5-ethylidenebicyclo[2.2.1]hept-2-ene.

Under similar reaction conditions, 1- and 2-methyl-5-vinylbicyclo[2.2.1]hept-2-ene obtained by the Diels-Alder addition of methyldicyclopentadiene with 1,3-butadiene, is isomerized to the corresponding methyl-substituted ethylidenebicyclo[2.2.1]hept-2-enes.

EXAMPLE II

Following the procedure described in Example I, 5-vinylbicyclo[2.2.1]hept-2-ene was isomerized at 150° C. 0.6 gram titanium trichloride (4 millimols) and about 0.2 gram lithium aluminum hydride (5 millimols) was employed as the catalyst. After 30 minutes 91.3% of the 5-vinylbicyclo[2.2.1]hept-2-ene was isomerized to 5-ethylidenebicyclo[2.2.1]hept-2-ene.

When the reaction is repeated employing the same catalyst system but obtained by pre-mixing the individual catalyst components in mesitylene prior to charging to the reactor, the same high conversion of 5-vinylbicyclo[2.2.1]hept-2-ene is observed.

EXAMPLE III

To 13.5 mls. 5-vinylbicyclo[2.2.1]hept-2-ene (0.1 mol) in about 20 mls. mesitylene was added 0.44 g. cyclopentadienyl titanium trichloride (2 millimols) and 4 millimols n-butyllithium (50% hexane solution). The reaction mixture was heated at 150° C. under an argon atmosphere. Vapor phase chromatographic analysis of the reaction product indicated 32% conversion of the 5-vinylbicyclo[2.2.1]hept-2-ene to 5-ethylidenebicyclo[2.2.1]hept-2-ene after 30 minutes. Additional heating gave essentially complete conversion of the 5-vinylbicyclo[2.2.1]hept-2-ene.

When the above reaction was repeated using a titanium trichloride (0.8 gram; 5 millimol)-n-butyllithium (10 millimol) catalyst, 5-vinylbicyclo[2.2.1]hept-2-ene was similarly isomerized to 5-ethylidenebicyclo[2.2.1]hept-2-ene.

EXAMPLE IV 5-ethylidenebicyclo[2.2.1]hept-2-ene was polymerized in solution with ethylene and propylene. To 500 mls. hexane maintained at −10° C. and saturated with a gas mixture (30 mol percent ethylene/70 mol percent propylene) was added 0.813 gram 5-ethylidenebicyclo[2.2.1]hept-2-ene and a reduced vanadium catalyst system (Al/V mol ratio=167). Throughout the polymerization the gas mixture (30/70) was continuously fed into the polymerizer with continuous agitation so that a concentration of about 30 mol percent ethylene was in the gas phase above the liquid. The polymerization was allowed to run for approximately 15 minutes. Approximately 4½ grams terpolymer was obtained upon precipitation with alcohol. The polymer contained about 33% by weight propylene and about 10% by weight 5-ethylidenebicyclo[2.2.1]hept-2-ene. Compounded polymers of this type are useful in the manufacture of tire carcass. Compounded with about 80 parts black, 40 parts oil, 0.8 part TMTD, 0.4 part MBTS and 1.25 parts sulfur and cured at 320° F., tensiles of about 3000 p.s.i. with about 250% elongation are typically realized.

I claim:
1. A process for the isomerization of 5-vinylbicyclo[2.2.1]hept-2-enes to 5-ethylidenebicyclo[2.2.1]hept-2- enes which comprises contacting a 5-vinylbicyclo[2.2.1]hept-2-ene of the formula

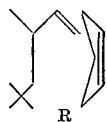

wherein R is a hydrogen or an alkyl group containing from 1 to 4 carbon atoms with a catalyst formed by mixing (1) a titanium compound selected from the group TiX$_3$ and

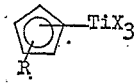

wherein R is hydrogen or an alkyl group containing from 1 to 4 carbon atoms and X is chlorine, bromine or iodine and (2) a compound selected from the group consisting of lithium aluminium hydride and an organolithium compound of the formula RLi wherein R is an alkyl group containing from 1 to 12 carbon atoms.

2. The process of claim 1 wherein the isomerization is conducted at a temperature between about 40° C. and 300° C. with about 1 to 10 mol equivalents of (2) per mol equivalent of (1).

3. The process of claim 2 wherein the 5-vinylbicyclo[2.2.1]hept-2-ene is 5-vinylbicyclo[2.2.1]hept-2-ene and (2) is lithium aluminum hydride.

4. The process of claim 3 wherein the isomerization is conducted in an inert aromatic or saturated aliphatic hydrocarbon diluent at a temperature between about 100° C. and 200° C.

5. The process of claim 4 with about 100 millimols to 0.1 millimol of the titanium compound per mol 5-vinylbicyclo[2.2.1]hept-2-ene.

6. The process of claim 5 wherein (1) is cyclopentadienyl titanium trichloride.

7. The process of claim 5 wherein (1) is titanium trichloride.

8. The process of claim 4 wherein the inert hydrocarbon diluent is mesitylene and about 50 millimols to 1 millimol titanium compound per mol 5-vinylbicyclo[2.2.1]hept-2-ene is employed.

9. The process of claim 8 wherein (1) is cyclopentadienyl titanium trichloride.

10. The process of claim 8 wherein (1) is titanium trichloride.

References Cited

UNITED STATES PATENTS

| | | | |
|---|---|---|---|
| 3,151,173 | 9/1964 | Nyce | 260—666 |
| 3,347,944 | 10/1967 | Fritz et al. | 260—666 |
| 3,472,824 | 10/1969 | Nakaguchi et al. | 260—666 |
| 3,211,709 | 10/1965 | Adamek et al. | 260—80.78 |

FOREIGN PATENTS 880,904  11/1957  Great Britain.

DELBERT E. GANTZ, Primary Examiner

V. O'KEEFE, Assistant Examiner

PO-1050
(5/69)

UNITED STATES PATENT OFFICE
CERTIFICATE OF CORRECTION

Patent No. 3,535,396          Dated October 20, 1970

Inventor(s) Wolfgang Schneider

It is certified that error appears in the above-identified patent and that said Letters Patent are hereby corrected as shown below:

Column 5, lines 3 to 7, the formula should appear as follows:

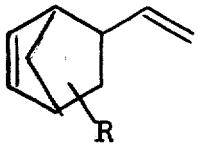

Column 6, line 7, "atdienyl" should read --tadienyl--.

SIGNED AND
SEALED
JAN 5 1971

(SEAL)
Attest:
Edward M. Fletcher, Jr.
Attesting Officer

WILLIAM E. SCHUYLER, JR.
Commissioner of Patents